(12) United States Patent
Patel et al.

(10) Patent No.: US 7,045,091 B1
(45) Date of Patent: May 16, 2006

(54) TRANSIENT LIQUID PHASE REACTIVE SINTERING OF ALUMINUM OXYNITRIDE (ALON)

(75) Inventors: Parimal J. Patel, Joppa, MD (US); Gary Gilde, Northeast, MD (US); James W. McCauley, Havre De Grace, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 496 days.

(21) Appl. No.: 10/211,547

(22) Filed: Aug. 5, 2002

(51) Int. Cl.
*C04B 35/10* (2006.01)

(52) U.S. Cl. .................. 264/654; 264/1.1; 423/266; 423/385

(58) Field of Classification Search .......... 501/96, 501/98; 264/1.2, 1.1, 654, 1.21; 428/210; 423/351, 409, 412, 579, 592.1, 600, 385
See application file for complete search history.

(56) References Cited

U.S. PATENT DOCUMENTS

| | | | |
|---|---|---|---|
| 4,241,000 A | 12/1980 | McCauley et al. | |
| 4,720,362 A | 1/1988 | Gentilman et al. | |
| 5,231,062 A * | 7/1993 | Mathers et al. ............ | 501/96.1 |
| 5,705,450 A * | 1/1998 | Chiao ........................ | 501/98.6 |

* cited by examiner

*Primary Examiner*—Dionne A. Walls
*Assistant Examiner*—Carmen Lyles-Irving
(74) *Attorney, Agent, or Firm*—Edward L. Stolarun

(57) ABSTRACT

A transparent aluminum oxynitride product is produced by a first heat treating step wherein a combination of $Al_2O_3$ and AlN at a temperature within the solid-liquid phase and a second step of sintering the heat treated combination at a temperature at least 50° C. less than the heat treating temperature. The method introduces a small fraction of liquid that aids in pore elimination and densification. In a single step, the material is shifted from the liquid/solid region into a solid AlON solution region, wherein the liquid is fully reacted with the solid AlON phase, with further sintering occurring. The procedure is sufficient to eliminate voids and other imperfections which often result in a reduction in optical clarity.

35 Claims, 1 Drawing Sheet

STEP 1: SINTER AT POINT A TO INTRODUCE LIQUID.
STEP 2: COOL TO POINT B AND ALLOW LIQUID TO RESORB TO PRODUCE SINGLE PHASE TRANSPARENT ALUMINUM OXYNITRIDE.

TRANSIENT LIQUID PHASE REACTIVE SINTERING OF ALUMINUM OXYNITRIDE (ALON)

GOVERNMENT INTEREST

The invention described herein may be manufactured, used and/or licensed by or for the United States Government.

BACKGROUND OF THE INVENTION

1. Field of the Invention

The invention relates to a method of outside of mold sintering of a shaped inorganic article or preform as to produce a transparent aluminum oxynitride product. More particularly, the invention relates to a method of outside of mold sintering a first heat treating step and a second sintering step, performed at a reduced temperature. The invention also relates to an aluminum oxynitride product formed by the method of the invention.

2. Discussion of the Prior Art

Transparent ceramics and especially ceramics that transmit light in the visible and infrared range are used in both commercial and military applications. Examples of these products include orthodontic brackets, gas tight lamp envelopes, radar domes, windows for infrared sensors, chemical processing equipment, refractory and ballistic armor.

The use of polycrystalline aluminum oxynitride for these products has been limited by the frequency of flaws found in the products made by known methods and the current cost of manufacturing.

The attainment of substantial transparency in a high density, polycrystalline aluminum oxynitride body is dependent upon a number of factors. These factors are related by the formula:

$$I/I_o = e^{-ad} \tag{1}$$

where:

$I_o$ is the intensity of incident visible light,

I is the intensity of transmitted visible light, a is the absorption coefficient of the material, and d is the thickness of the specimen.

The absorption coefficient of the specimen is used to account for the natural transmissivity of a perfect specimen of the material and also all light scattering impurities and imperfections in a sample. Impurities may include any amount of a second phase, such as one or more liquid, glass or noncrystalline phases, in or around a solid grain. Imperfections may include voids trapped at grain boundaries and within grains. Imperfections include grain boundary cracks resulting from abnormal grain growth or from excessively large rates of grain growth.

Polycrystalline, cubic aluminum oxynitride is used in commercial and military applications because it is a transparent ceramic and has other desirable physical properties. U.S. Pat. No. 4,241,000 to J. W. McCauley et al., herein incorporated by reference in its entirety, teaches a conventional process for making this material. In the process, precursor powders are first mixed and then simultaneously reacted and sintered to produce the resulting single phase, polycrystalline, cubic aluminum oxynitride body. These bodies are reported to have a density of 99% of theoretical density and an in-line transmission of at least 50% in the wavelength range of 0.3 to 5 microns.

The manufacture of aluminum oxynitride bodies for the industrial and military purposes cited above has been hindered by the frequency of flaws found in the products made by conventional methods. The physical and chemical flaws have shown effect on the optical transparencies of the resulting bodies.

The flaws that affect optical properties are attributed to a number of causes. Such flaws generally result in differing optical properties throughout an otherwise uniform product. A first major cause of optical flaws is the lack of homogeneity of inorganic substituents (chemical processing aids) throughout the product. Non-homogeneity may be caused by insufficient mixing of constituents prior to sintering.

A second significant cause of optical imperfections has been found to be the presence of impurities such as glasses or voids in or around the crystalline grains. Voids, sometimes referred to as pores, have irregular boundaries that may scatter light. Additionally, the refractive index of any gas contained in a pore or any glass in solid solution in or around a grain is significantly different from that of the grain itself. For example, air has a refractive index of 1.0, whereas the refractive index of flawless aluminum oxynitride ranges around 1.785. The measured value of refractive index depends on the relative amount of aluminum nitride indicated by the value of x in the chemical formula for aluminum oxynitride (See Formula 2. below).

Conventionally, aluminum oxynitride products are produced commercially in a process described in U.S. Pat. No. 4,520,116 to Gentilman et al.; U.S. Pat. No. 4,686,070 to Maguire et al.; and U.S. Pat. No. 4,481,300 to Harnett et al., each of which is hereby incorporated by reference in its entirety. Therein is described a process by which (1) carbon and aluminum oxide are mixed for several hours; (2) the mixed powders are heated to a temperature of 1200° C. for several hours to reduce the surface of the aluminum oxide to aluminum nitride; (3) the powders are reacted at a temperature between 1550° C. and 1850° C. in flowing nitrogen for several hours to fully react the powders to form aluminum oxynitride; (4) the reacted powder is ball milled in methanol for 16 hours to break down hard agglomerates; (5) the dried powder is heated in air to 600° C. for 2 hours to burn off residual organic material; (6) sintering aids, e.g. B, $La_2O_3$, are added to the AlON powder and mixed; (7) a green body is formed using conventional ceramic forming techniques; and finally (7) the green body is sintered at a temperature between 1900° C. and 2140° C. for dwell times between 24 to 48 hours.

Therefore, there exists the need in the art for a simplier process capable of producing an aluminum oxynitride product which is transparent.

SUMMARY OF THE INVENTION

In accordance with the invention, a method is provided for preparing a dense polycrystalline aluminum oxynitride body or product. Precursor fine grain powders comprising $Al_2O_3$ and 27 mole % to 30 mole % AlN are mixed and compacted. Compacting includes uniaxial pressing at a first pressure of at least about 5000 psi and then cold isostatic pressing at a second pressure of at least about 25,000 to 28,000 psi for at least about 30 seconds to produce a green body having many voids.

The green body is then heat treated in an oxygen-free atmosphere at a heat treating temperature in the range of about 1950° C. to 2025° C. and in the solid-liquid phase region of the phase diagram. This produces a two phase, solid-liquid phase intermediate material/body. This material/ body is maintained at the heat treating temperature for a time period of 0.5 to 8 hours, to produce a dense intermediate material/body, which is reduced in voids.

The dense intermediate composition is then sintered at a sintering temperature at least 50° C. below the heat treating temperature and in the range of about 1900° C. to 2000° C. and in the solid phase region of the phase diagram.

The sintered body is then cooled at a controlled rate of about 5° C./minute or less to prevent cracking. The result is a transparent, sintered aluminum oxynitride.

During compacting, the green body can be preferably shaped for any use, such as ballistic armor. Products made in accordance with the invention are particularly useful for transparent ballistic armor.

When the technique of the invention is conducted, a transparent article of AlON can be produced, without the use of a hot isostatic pressure (HIP) for final consolidation. This allows the production of AlON with sizes that are not limited by the size of the high pressure chamber, resulting in lower production costs. The use of a liquid phase is used to reduce sintering times. Additionally, there is no requirement to form the AlON powder prior to sintering. Overall, the method of the invention otters several advantages over a HIP process that significantly reduces the requirements of producing transparent aluminum onynitride in both cost and time.

Additional objects, features and advantages of the present invention will become more fully apparent from the following detailed description of preferred embodiments, when taken in conjunction with the drawings wherein like reference numerals refer to corresponding parts in the several views.

DETAILED DESCRIPTION OF THE PREFERRED EMBODIMENTS

Figure 1:
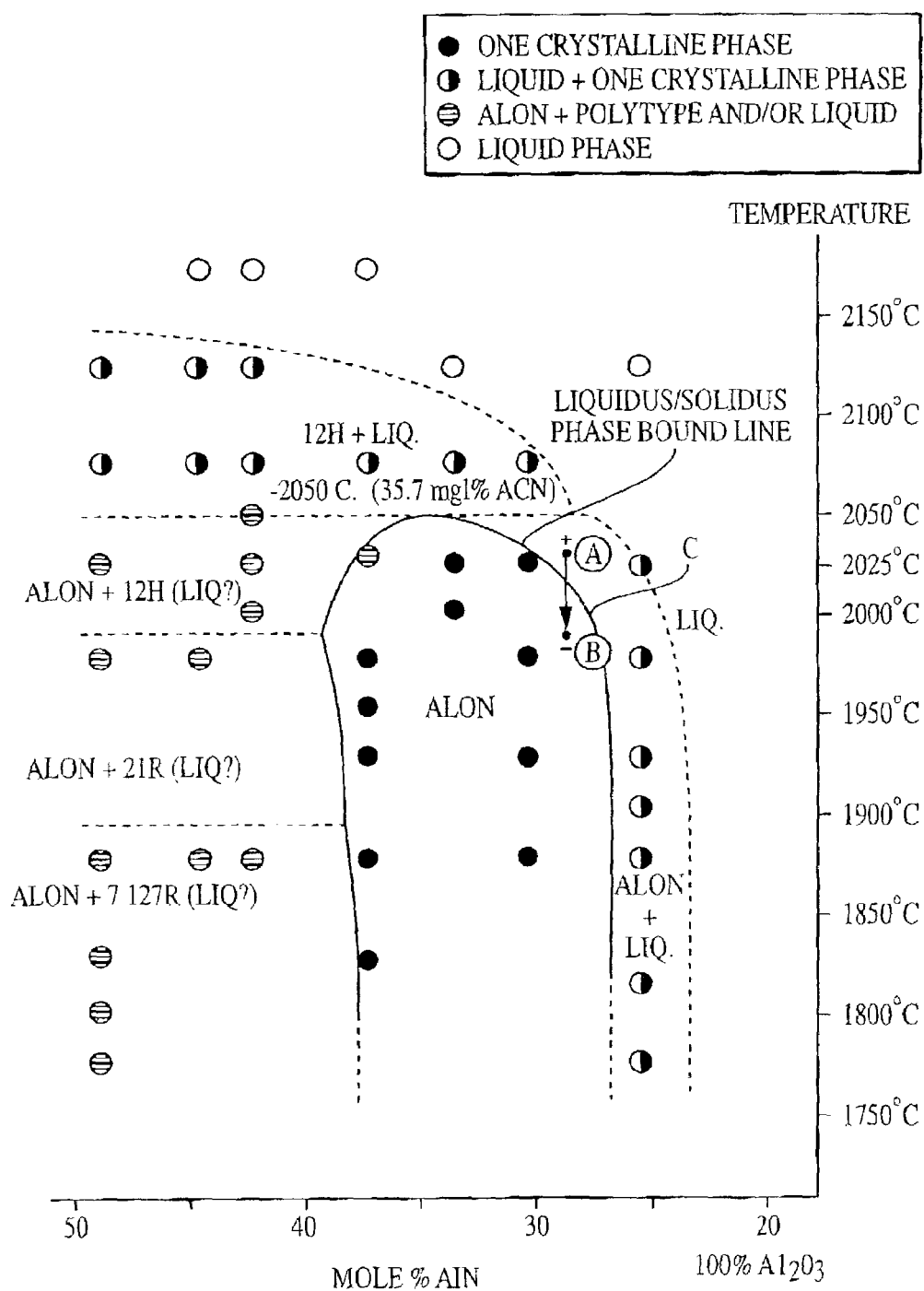
FIG. 1 is a phase equilibrium diagram for aluminum oxynitride expressed as a pseudo binary mixture.

Aluminum oxide (alumina) is known by the chemical formula $Al_2O_3$. Aluminum nitride is known by the chemical formula AlN. Aluminum oxynitride is known by the chemical formula:

$$Al_{(64+x)/3}O_{32-x}N_x \qquad (2)$$

In the chemical literature, aluminum oxynitride is often referred to generically by the abbreviated notation, AlON. This abbreviated notation does not specify the relative proportion of aluminum, oxygen and nitrogen but instead implies the entire range of x. Stable aluminum oxynitride exists in the range of x from above about 3.5 to about 6.0.

The reaction of aluminum oxide with aluminum nitride to form aluminum oxynitride is carried out according to the following reaction:

$$Al_2O_3 + X\ AlN \rightarrow Al_{(64+x)/3}O_{32-x}N_x \qquad (3)$$

In the instant present, aluminum oxynitride includes 27 mole % to 30 mole % aluminum nitride with the balance comprising aluminum oxide. This corresponds with a value of x ranging from 3.5 to 4. For example, one common aluminum oxynitride composition wherein x is 3.5 is made according to the formula:

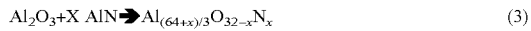
$$9.5Al_2O_3 + 3.5AlN \rightarrow Al_{22.5}O_{28.5}N_{3.5} \qquad (4)$$

Both aluminum oxide powder and aluminum nitride powder are commercially available in fine-grained form suitable for use in manufacturing ceramics. Aluminum oxide (alumina) is commercially available in fine-grained powder form having a purity of at least 99.98% and an average particle size of about $0.1\mu$ to $2\mu$. Aluminum nitride is commercially available in fine-grained powder form having a purity of at least 99.98% and an average particle size of 0.1 to $2\mu$. A quantity of aluminum oxide is weighed and placed in a mixer. To this is added a weighed amount of aluminum nitride. The aluminum nitride is added in an amount so that the combined powder is 27 to 30 mole % aluminum nitride and 73 to 70 mole % aluminum oxide.

Sintering aids may be added. A sintering aid is an additional inorganic compound that increases the rate or extent of densification or consolidation during sintering. Mixing is carried out, by way of example in a ball mill in a fluid medium such as methanol, ethanol, mixture thereof or the functional equivalent thereof for a period of time in the range of 8 hours to 48 hours to produce a homogeneous mixture.

The aluminum oxide-aluminum nitride mixture is placed in a shaped steel die and compacted, first by uniaxial pressing and second by cold isostatic pressing. Uniaxial pressing is at a pressure of at least 5000 psi. Cold isostatic pressing is at a pressure of about 25,000 to 28,000 psi for at least about 30 seconds dwell time. The term cold is understood to mean ambient temperature.

Uniaxial pressing comprises applying pressure to a sample from a single direction. The application of unidirectional pressure is limited by, inter alia, die wall friction and pressure distribution within the sample. Accordingly, the length to diameter ratio of the sample must be limited to relatively low values. Uniaxial pressing dies and presses are commercially available and techniques for their use so well known that uniaxial pressing can be carried out on samples without experimentation.

Isostatic pressing comprises applying pressure on all surfaces and throughout a sample. A sample is placed in a pliable rubber or polymer mold and pressed uniformly while immersed in a high pressure oil or water cylinder. Isostatic pressing dies and presses are commercially available and techniques for their use so well known that isostatic pressing can be carried out on samples without experimentation.

A crucible containing the compacted green body is loaded into a refractory metal furnace and heat treated in an oxygen-free atmosphere of flowing nitrogen, e.g. 1 to 2 atmospheres.

FIG. 1 is a phase equilibrium diagram for aluminum oxynitride under one atmosphere of flowing nitrogen. The phase diagram is for aluminum oxynitride expressed as a pseudo binary with compositions consisting of 20 mole % to 50 mole % AlN.

In the phase diagram, temperature of the aluminum oxynitride is plotted on the ordinate. The temperature range is from 2150° C. at the top of the ordinate to 1750° C. at the bottom of the ordinate. Both the narrower range for heat treating temperature and the narrower range for sintering temperature are contained within the broader temperature range plotted on the ordinate. Aluminum oxynitride, expressed as mole % AlN as shown in chemical formula (4) is plotted on the abscissa. On the abscissa is the mole % AlN in the compound, which on the abscissa ranges from 20 mole % AlN on the right to 50 mole % AlN on the left. The solubility range is from about 27 mole % to 38 mole % AlN. The narrower inventive range comprising 27 mole % to 30 mole % AlN is contained within the broader range of the AlN solubility.

In the phase diagram are data plotted in seven distinct phase assembly regions. Only two possible phase assemblies exist within the composition range and temperature range of the invention. The composition range of the invention is aluminum oxynitride comprising 27 mole % to 30 mole % AlN. A preferable temperature range of the invention includes (1.) the heat treating temperature, about 1950° C. to about 2025° C., (2.) the sintering temperature, about 1900° C. to about 2000° C., and (3.) lower temperatures, that is temperatures below 1900° C. down to ambient temperature.

The aluminum oxynitride compounds preferred for use with the present invention are those expressed in pseudo binary notation as 27 to 30 mole % aluminum nitride. This implies 73 to 70 mole % aluminum oxide, and results in a range for x of 3.5 to 4, expressed by the formula:

$$Al_{(64+x)/3}O_{32-x}N_x \quad (5)$$

Within the preferred composition range and the temperature range of the invention, only two phase assemblies for aluminum oxynitride are possible. These are a first region labeled "AlON+Liq." and a second region labeled "AlON". The first phase region, labeled "AlON+Liq.", is a liquid plus solid phase (AlON) region. In this region, aluminum oxynitride (AlON) exists in a solid phase in conjunction with a liquid phase. The second phase region, labeled "AlON", is a solid phase region. In the second phase region, aluminum oxynitride exists only as a solid phase solution. Liquid does not exist in this composition at these temperatures.

According to the invention, the compacted green body is heat treated at a heat treating temperature in the range of about 1950° C. to about 2025° C. and in the solid-liquid phase region. In the phase diagram, this is represented by way of example, as operating point A for an aluminum oxynitride expressed as 28 mole % AlN.

Heat treating is preferably carried out at a heat treating temperature of about 1950° C. to about 2025° C. for up to eight hours, typically one hour to eight hours, and in the absence of oxygen to produce a dense intermediate material. This temperature range is particularly selected such that the green body will be in the liquid-solid two phase region. Therefore, it is considered within the scope of the present invention to heat treat the green body at away temperature within the solid-liquid phase range indicated in FIG. 1.

When the heat treating period is completed, the furnace temperature is lowered at a controlled rate of about 5° C./minute, preferably 1 to 5° C./minute to a sintering temperature at least about 50° C. below the heat treating temperature and in the range of about 1900° C. to about 2000° C. and in the solid phase region of the phase diagram. This operating point is represented by point B in the phase diagram. This temperature range is particularly selected such that the heat treated body will be in the solid single phase region. Therefore, it is considered within the scope of the present invention to sinter the green body at any temperature within the solid phase region indicated in FIG. 1. Because the composition does not change during the heating operations, operating point B is vertically below operating point A. The material passes through a phase boundary between operating point A and operating point B. This is indicated in the phase diagram by the phase boundary line C. The phase boundary is the boundary between the liquid/solid phase region and the solid phase region.

The dense intermediate material is sintered at operating point B for a period of time to produce a sintered body. Sintering is typically for periods of time in the range of about 0.5 to 8 hours, preferably 3 to 8 hours and in the absence of oxygen. Heating is terminated and the furnace cooled at a controlled rate of about 5° C./minute, preferably 1 to 5° C./minute, to produce a shaped polycrystalline aluminum oxynitride body. The body is dense, essentially free of voids and translucent to transparent in appearance.

At the temperatures preferred for heat treating, the material exists as a solid and liquid material. That is, they exist as a solid solution of a solid material having a separate liquid phase in conjunction, but not dissolved therein. It is theorized that this separate liquid phase is the means by which voids are removed from the solid phase. The included liquid flows between the solid grain, allowing avenues for diffusion outside of the body. A heat treating time period of 0.5 to 8.0 hours has been found by experimentation to be sufficient to remove all of the pores in the body thereby freeing the material of voids. Any voids at the grain boundaries are eliminated as well.

After heat treating, the temperature of the material is reduced by at least about 50° C. It is seen on the phase diagram, at this reduced temperature, that body exists only as a solid, single aluminum oxynitride phase material. No liquid exists with the solid phase at this temperature for the specified compositions. Accordingly, all liquid is reacted in the solid grains, leaving them as a dense solid. Also, in the transformation from the two phase region to the single phase region any liquid does not migrate to grain boundaries, but is dissolved in the entire crystalline solid material. The result is a dense, polycrystalline, single phase solid ready for final sintering.

Sintering is then carried out at a temperature in the range of about 1900° C. to about 2000° C. It is known in the art to sinter at temperatures up to 2025° C. and higher. However, sintering temperatures above about 2000° C. allow reformation of a liquid phase and permit the formation of voids as the liquid is vaporized during sintering. For this reason, it is preferred that sintering be carried out at a temperature of about 2000° C. or less in order to attain the densest possible polycrystalline product. It has been found in the laboratory that densities of 99.98% of theoretical density are achievable.

EXAMPLES 1–7

The following samples are compounded, heat treated and sintered single phase polycrystalline cubic aluminum oxynitride samples constructed in accordance with the present invention, with only distinctions being the heat treat and sintering durations and temperatures. The following data were recorded.

|     | FIG. 1, pt. A (two phase region) Heat Treating Temp. (Time) | FIG. Pt. B (one phase region) Sintering Temp. (Time) | Observation |
|-----|-------------------------------------------------------------|------------------------------------------------------|-------------|
| 1a. | 2025° C. (30 minutes)   | 2000° C. (4 hours)   | Translucent |
| 1b. | 2025° C. (30 minutes)   | 2000° C. (8 hours)   | Translucent |
| 1c. | 2025° C. (30 minutes)   | 2000° C. (12 hours)  | Translucent |
| 1d. | 2025° C. (30 minutes)   | 2000° C. (16 hours)  | Translucent |
| 2a. | 2025° C. (5 minutes)    | 1950° C. (16 hours)  | Translucent |
| 2b. | 2025° C. (30 minutes)   | 1950° C. (16 hours)  | Translucent |
| 2c. | 2025° C. (60 minutes)   | 1950° C. (16 hours)  | Translucent |
| 2d. | 2025° C. (120 minutes)  | 1950° C. (16 hours)  | Translucent |
| 3.  | 2025° C. (1 minute)     | 1975° C. (16 hours)  | Translucent |
| 4a. | 2010° C. (15 minutes)   | 2010° C. (4 hours)   | Translucent |
| 4b. | 2010° C. (30 minutes)   | 2010° C. (4 hours)   | Translucent |
| 4c. | 2010° C. (60 minutes)   | 2010° C. (4 hours)   | Translucent |
| 5.  | 2010° C. (60 minutes)   | 2000° C. (16 hours)  | Translucent |
| 6.  | 2025° C. (60 minutes)   | 1900° C. (8 hours)   | Transparent |
| 7.  | 1950° C. (24 hours)     | —                    | Opaque      |

From this data it can be clearly seen that when a heat treating is performed for 1 hour at 2025° C. and a sintering step is performed for 8 hours at 1900° C., the resulting transparent aluminum oxynitride product is observed to be transparent.

Transparency is related to optical density, D. Optical density is defined according to the equation:

$$D=\log(I_o/I) \quad (6)$$

wherein:

$I_o$ is the intensity of incident visible light, and

I is the intensity of transmitted visible light.

Visible light has a wavelength in the range of 0.38 to 0.76μ.

In the art, the term "transparent" has two mutually consistent definitions. Under a first definition, the term transparent means that a sample has a percent diffuse transmission value of at least 35%, based on a flat, polished 1.25 millimeter thick body. The percent diffuse transmission, T, is related to optical density according to the equation:

$$D=\log(I/T) \quad (7).$$

According to a second definition, the term transparent means that a sample has an in-line transmission value of at least 10% in the wavelength range of 0.25 to 6 micrometers, based on a flat, polished 1 millimeter thick body.

In the art, the term "translucent" also has two mutually consistent definitions. According to the first definition, the term means that a sample has a diffuse transmission value just below that defining "transparent", e.g. partly transparent. According to the second definition, the term means admitting and diffusing light so that an object can be identified or distinguished but not clearly distinguished. For example, print can be read through a transparent sample. Print can be identified though it cannot be read through a translucent sample.

In the art, the term "opaque" means no light transmission is detectable.

The heat treated sample of Example 7 was not sintered because it was opaque and therefore not useful for applications requiring optical clarity.

Although the present invention is herein with reference to preferred embodiments, it should readily understood that various changes and/or modifications could be made to the invention without departing from the spirit thereof. In any event, the invention is only intended to be limited by the scope of the following claims.

We claim:

1. A method of preparing polycrystalline aluminum oxynitride comprising:

combining a first composition comprising $Al_2O_3$ and a second composition comprising AlN;

heat treating the combination to a temperature of at least about 1950° C. in a solid-liquid phase region for the aluminum oxynitride; and sintering the heat treated combination at a temperature at least 50° C. less than the heat treating temperature in a solid single phase region for the aluminum oxynitride.

2. The method of claim 1, wherein the temperature of said heat treating is from about 1950° C. to about 2025° C.

3. The method of claim 1, wherein said heat treating is performed in an oxygen-free environment.

4. The method of claim 1, wherein said heat treating is performed in a nitrogen environment.

5. The method of claim 1, wherein said heat treating is performed for about one minute to about 8 hrs.

6. The method of claim 1, wherein said sintering is performed at a temperature of about 1900°–2000° C.

7. The method of claim 1, wherein said sintering is performed for about 0.5 to about 8 hours.

8. The method of claim 7, wherein said sintering is performed for about 3 to about 8 hours.

9. The method of claim 1, wherein said sintering is performed in an oxygen-free environment.

10. The method of claim 1, wherein said sintering comprises adding sintering aids.

11. The method of claim 1, wherein said heat treating and said sintering are performed in a furnace and further comprising cooling said furnace to ambient temperature.

12. The method of claim 11, wherein said cooling comprises reducing the temperature of the furnace at a rate of about 1° to about 5° C./min.

13. The method of claim 1, wherein said polycrystalline oxynitride is translucent to transparent.

14. The method of claim 1, wherein said combining comprises:

uniaxially compressing a mixture of the first composition and the second composition at a first pressure; and cold isostatic pressing the mixture at a second pressure.

15. The method of claim 14, wherein the first pressure is at least about 5000 psi.

16. The method of claim 15, wherein said combining further comprises ball milling the mixture in ethanol and/or ethanol for 8 to 48 hours.

17. The method of claim 14, wherein the second pressure is about 25000 to about 28000 psi, and said cold isostatic pressing is performed for at least about 30 seconds.

18. The method of claim 1, wherein said combining comprises providing 27% to 30% mol. AlN.

19. The method of claim 1, wherein no aluminum oxynitride powder is created.

20. A method of preparing polycrystalline aluminum oxynitride comprising:

combining a first composition comprising $Al_2O_3$ and a second composition comprising AlN;

heat treating the combination at a first temperature within a solid-liquid phase; and sintering the heat treated combination at a second temperature within a solid single phase to produce a transparent product.

21. The method of claim 20, wherein the first temperature of said heat treating is from about 1950° C. to about 2025° C.

22. The method of claim 20, wherein said heat treating is performed in an oxygen-free environment.

23. The method of claim 20, wherein said heat treating is performed for about one minute to about 8 hrs.

24. The method of claim 20, wherein the second temperature of said sintering is performed at a temperature of about 1900° to about 2000° C.

25. The method of claim 19, wherein said sintering is performed for about 0.5 to about 8 hours.

26. The method of claim 20, wherein said sintering is performed for about 0.5 to about 8 hours.

27. The method of claim 20, wherein said sintering is performed for about 3 to about 8 hours.

28. The method of claim 20, wherein said sintering is performed in an oxygen-free environment.

29. The method of claim 20, wherein said heat treating and said sintering are performed in a furnace and further comprising cooling said furnace to ambient temperature.

30. The method of claim 29, wherein said cooling comprises reducing the temperature of the furnace at a rate of about 1° to about 5° C./min.

31. The method of claim 20, wherein said combining comprises:
uniaxially compressing a mixture of the first composition and the second composition at a first pressure; and
cold isostatic pressing the mixture at a second pressure.

32. The method of claim 31, wherein the first pressure is at least about 5000 psi.

33. The method of claim 31, wherein the second pressure is about 25000 to about 28000 psi, and said cold isostatic pressing is performed for at least about 30 seconds.

34. The method of claim 20, wherein said combining comprises providing 27% to 30% mol. AlN.

35. The method of claim 20, wherein no aluminum oxynitride powder is created.

* * * * *